Jan. 26, 1960  H. H. DOUGLASS ET AL  2,922,950
AUTOMATIC ELECTRICAL AUTOPILOT ANALYZER SYSTEM
Filed June 7, 1957  2 Sheets-Sheet 1

INVENTORS
HARRY H. DOUGLASS
LEON A. MILLER
OTTO BERGER
BY
ATTORNEY

Jan. 26, 1960  H. H. DOUGLASS ET AL  2,922,950
AUTOMATIC ELECTRICAL AUTOPILOT ANALYZER SYSTEM
Filed June 7, 1957  2 Sheets-Sheet 2

INVENTORS
HARRY H. DOUGLASS
LEON A. MILLER
OTTO BERGER
BY Julian C. Renfro
ATTORNEY

United States Patent Office 2,922,950
Patented Jan. 26, 1960

2,922,950
AUTOMATIC ELECTRICAL AUTOPILOT ANALYZER SYSTEM

Harry H. Douglass, Essex, and Leon A. Miller, Baltimore, Md., and Otto Berger, North Merritt Island, Fla., assignors to The Martin Company, Middle River, Md., a corporation of Maryland Application June 7, 1957, Serial No. 664,202

10 Claims. (Cl. 324—57)

The present invention relates to an electrical analyzer system for verifying the performance of an aircraft or missile autopilot prior to its launching, and more particularly to such a system wherein improved test apparatus is employed to automatically verify such performance.

A conventional autopilot system controls the flight of a missile by producing error signals indicative of deviation from a predetermined course of flight and then in response to such signals adjusts one or more of the missile controls to correct for the deviation. Generally, such a system includes a separate control channel for each of the axes of deviation, namely, pitch, roll, and yaw. Error signals for each of these channels may be produced by a reference source such as a gyrostabilizing system.

In verifying the performance of an autopilot system two basic tests are employed. One of the tests measures departures from a reference of the static gain of each channel of the autopilot system. Static gain may be defined as the ratio of the movement of the missile controls to the magnitude of the error signal produced by the reference source. The other of the tests measures departures from a reference of the dynamic response of each channel of the autopilot system. Dynamic response may be defined as the phase lag between the movement of the missile controls and the error signal produced by the reference source.

Departures from reference static gain or dynamic response in the individual channels may result in the development of divergent oscillations in the missile controls which ultimately may result in loss of control and in the loss of the missile. On the other hand maintenance of the reference static gain and dynamic response in the individual channels will insure the autopilot's ability to stabilize the missile in flight.

It is the principal object of the present invention to provide an improved electrical autopilot analyzer system which automatically verifies autopilot performance without human intervention.

To this end the invention provides a static gain test apparatus which is unusually reliable and accurate in operation.

In addition, the invention provides a dynamic response test method and apparatus which is particularly adapted for automatic operation.

Heretofore the dynamic response of an autopilot system has been verified by tests of the frequency response of the individual channels. That method required constant human supervision and therefore is not adapted for use in automatic test equipment.

In the improved system the dynamic response of each channel of an autopilot system is verified by testing its closed-loop transient response to a transient step input voltage. This test produces well-defined indications of variation in dynamic response which are easily detected by automatic means. In addition, the test apparatus provided by the invention to effect such test employs circuitry which is characterized by reliability and accuracy in operation.

Each of the individual channels of an autopilot system has different characteristics. For this reason a separate static gain and dynamic response test apparatus is required for each channel. In order that the verification of the autopilot system may be performed fully automatically the improved test system provides switching circuitry interconnecting the plurality of test apparatus. This circuitry is adapted to automatically and sequentially initiate a test cycle in each succeeding test apparatus upon the production of a "go" signal voltage in a preceding test apparatus indicating the completion of a successful test cycle. Thus the circuitry operates to automatically switch from test apparatus to test apparatus and from channel to channel until the performance of the entire autopilot system has been verified.

To insure the accuracy of the automatic verification the switching circuitry is further adapted to interrupt the switching sequence in the event of the production of a "no-go" signal voltage by a test apparatus indicative of channel malfunction. The invention then provides self-test circuitry which is automatically connected to the test apparatus producing the indication of channel malfunction. This circuitry is adapted to interrogate the test apparatus to determine whether the channel tested or the test apparatus itself is at fault. Appropriate remedial steps in accordance with the results of this interrogation may then be taken.

This invention can be best understood by referring to the following drawings in which.

Figure 1:
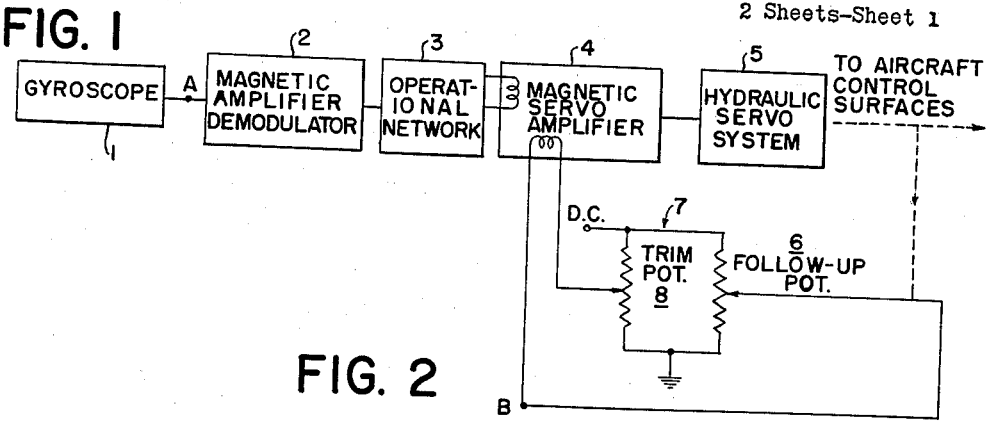
Fig. 1 is a block diagram of a typical autopilot control channel.

Referring to Fig. 1 the magnetic amplifier autopilot channel illustrated therein is typical of those conventionally employed in guided missiles. The channel employs a gyroscope 1 as a reference source. The gyroscope is adapted to produce an A.C. error signal, the amplitude of which is representative of the degree of axial deviation of the missile from a predetermined course. The output of the gyroscope is applied to a magnetic amplifier demodulator 2 which produces at its output a D.C. voltage having a magnitude proportional to the amplitude of the error signal. The D.C. voltage is applied to an operational network 3 of the lead or lag type or combinations thereof dependent upon the function of the particular channel. The output of the operational network is inductively coupled into a magnetic servo amplifier 4 which drives an hydraulic servo system 5. The mechanical output of the hydraulic servo system is connected to actuate the missile control surfaces.

The mechanical output of the servo system also drives the arm of a follow-up potentiometer 6 which forms part of a D.C. bridge follow-up network 7. The D.C. network utilizes a trim potentiometer 8 as a reference for the bridge, both the trim potentiometer and follow-up potentiometer being connected to the same D.C. reference source. Thus mechanical movement of the arm of the follow-up potentiometer 6 produces a D.C. voltage signal, the magnitude of which is proportional to the actuation applied to the aircraft control surfaces. This control signal is inductively fed back to the magnetic servo amplifier 4 and also employed as an indication of the response of the autopilot channel to the error signal from the gyroscope.

The autopilot channel of Fig. 1 is applicable for service in the control of either pitch, roll, or yaw axial deviations. The difference between the channels employed for these purposes lies in the choice of the operational networks employed. These networks may be of the lead or lag types, or combinations thereof dependent upon the function of the autopilot channel.

In terms of the autopilot channel of Fig. 1 static gain is defined as the change in the control signal output at the arm of the follow-up potentiometer (point B) divided by the amplitude of the error signal (point A) causing the control voltage change at point B.

Figure 2:
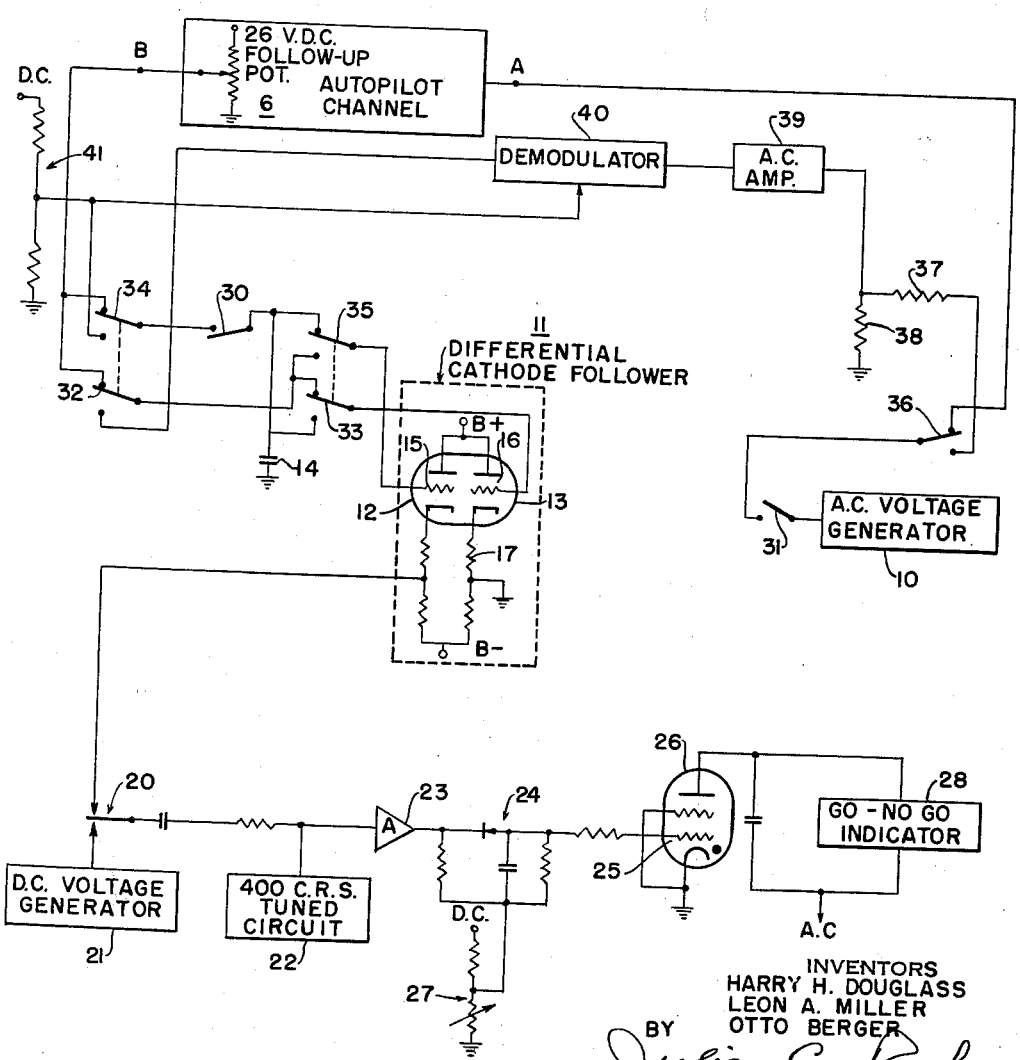
Fig. 2 is a block diagram, portions of which are illustrated schematically, of a static gain test apparatus in accordance with the invention.

The improved static gain test apparatus is illustrated in Fig. 2. The apparatus is designed to measure the change in the control voltage at point B in response to the application of a test input voltage at point A and to determine whether the value of this voltage change departs by a predetermined maximum from a known reference value representative of the design static gain of the autopilot channel.

The following is a description of the static gain test apparatus. The switching circuitry employed therewith will not be described until later in the specification. The test apparatus includes a voltage source adapted to produce an A.C. voltage having an amplitude of preselected value. This A.C. voltage is used as the test input voltage and is applied through switching circuitry to point A of the autopilot channel. There it simulates the output of the gyroscope. To insure test accuracy both 0° and 180° phase test input signals are employed to check the channel's static gain.

In an actual test the follow-up potentiometer was excited with 26 volts D.C. The input voltage applied at point A was then selected to cause a change of plus or minus 5.2 volts D.C. at point B if the static gain of the autopilot channel was within its design value. To comply with the specifications of the test, the static gain was checked to a tolerance of 10 percent with 2 percent added due to the tolerances of the injected test voltage.

The output at point B of the follow-up potentiometer is applied through switching circuitry to a differential cathode follower circuit 11. The differential cathode follower performs two very important functions in the static gain test apparatus. First, it permits the use of a voltage-storing circuit, which establishes as a reference the voltage at the arm of the follow-up potentiometer prior to the injection of the test input voltage at the point A. Second, it gives an output voltage which is proportional to the change in the follow-up voltage at the point B and is accurately referred to a preselected reference potential. Third, it has a high input impedance which prevents the loading of preceding circuits.

The differential cathode follower circuit 11 comprises a pair of triode vacuum tubes 12 and 13 having their plates connected to the same positive reference potential. The cathodes of the vacuum tubes are connected through independent load impedances to the same negative reference potential. The control grids of the vacuum tubes are independent of one another. In such a circuit the difference in the output voltages developed across the cathode load impedances is proportional to the difference in magnitude between a pair of input voltages applied to the control grids.

The voltage-storing circuit employed by the cathode follower circuit is simply a capacitor element 14 having one end connected to a preselected reference potential, in this case ground. The other end of the capacitor is connected to point B to store a voltage having a value equal to the voltage at point B prior to the application of the test input voltage to the autopilot channel. The capacitor is then disconnected from point B and connected to one of the control grids of the differential cathode follower circuit. Since the capacitor is applied to an open grid of the cathode follower it will hold its charge for a long period thus establishing an accurate reference.

The other grid 16 of the cathode follower is connected to the point B at the time the input voltage is applied to the autopilot channel. Thus the input voltages applied to the grids will be equal to the control signals at point B before and after the application of the test input voltage to the cathode follower circuit. The output of the cathode follower will then be accurately proportional to the change in the test output voltage of the autopilot channel in response to the application of the test input voltage at point A. The output voltage of the cathode follower circuit may be referred to a preselected potential by connecting one of the cathode load impedances to that potential. In the present embodiment impedance 17 is connected to ground.

The output voltage from the differential cathode follower is then applied to a comparator circuit. The comparator is adapted to measure the test output voltage of the differential cathode follower and to determine if it departs by a predetermined maximum from a preselected reference value representative of the design static gain. To this end the test output voltage is applied to one contact of a two-pole chopper circuit 20. The other contact of the chopper circuit is attached to a D.C. voltage generator 21 producing a voltage having the preselected design reference value. In the actual test described the reference voltage had a value equal to 5.2 volts times .64=3.3 volts D.C., where .64 is the cathode follower gain.

Thus the chopper compares the test output voltage with a voltage having the design reference value and produces a square wave voltage having a total amplitude equal to the difference between the two. The remainder of the comparator circuit is designed to produce an indication when the amplitude of the square wave voltage exceeds a fixed value representative of a departure of the test output voltage beyond a pre-established tolerance. In this circuitry the square wave voltage is employed to modulate the output of a tuned circuit 22. The modulated output is then amplified in circuit 23 and converted to a D.C. voltage by means of a rectifying network 24.

The value of the square wave voltage which exceeds the preselected tolerance is established by means of the bias applied to the control grid 25 of a thyratron vacuum tube 26. This bias is varied by changing the value of a reference voltage applied to the rectifier network through a variable voltage source 27. The bias is fixed at a positive value adapted to fire the thyratron tube and energize an indicator circuit 28. The indicator circuit is adapted to produce a "go" signal in its energized condition, which indication represents a satisfactory test.

With a finite amplitude of square wave voltage, the amplifier produces an output voltage which is negatively rectified by network 24 and therefore subtracts from the positive bias on the thyratron 26. Thus when the square wave exceeds a preselected value the thyratron is cut off, de-energizing the indicator circuit 28. Upon being de-energized the indicator circuit produces a "no-go" signal representative of an unsatisfactory test. The preselected value of square wave voltage required to cut off the thyratron is thus established by the positive bias in the thyratron, which may be varied in accordance with the preselected permissible tolerance. In the actual test described the positive bias was set to de-energize the indicator circuit when the square wave voltage exceeded 3.3 volts D.C. times 12 percent=.40 volt D.C., 12 percent being the tolerance selected for the particular test.

In operation the static gain test apparatus performs its test automatically by means of switching relays. These relays are controlled by a timing network set to perform the various elements of the test in their proper sequence. Any of the well-known timing networks and relays adapted for this purpose may be employed.

The timing network initially closes a relay switch 30 which connects the capacitor to point B of the autopilot channel through relay switch 34. After a time interval permitting the capacitor to store its reference voltage the relay 30 is opened and the output of the capacitor applied to one of the control grids of the cathode follower circuit through relay switch 35. The test input voltage is then applied to point A of the autopilot channel by the closing of relay switch 31. The test output voltage at this time is applied to the other grid of the cathode follower circuit through relay switches 32 and 33.

It will be noted that the contact arms of switches 33 and 35 are mechanically linked. These switches are provided to reverse the connections to the control grids of the cathode follower circuit so that the output of the cathode follower will always be positive during a static gain test.

A self-test circuit is provided for the test apparatus in the event that indicating circuit 28 produces a "no-go" signal at the end of a static gain test cycle. The self-test circuit determines whether the aircraft autopilot channel or test apparatus is at fault in the production of the "no-go" signal. Appropriate remedial steps in accordance with the result of the interrogation may then be taken.

Relay switches 36, 32, and 34 are adapted to connect the test apparatus to the self-test circuit. The self-test circuit includes a network designed to simulate the autopilot channel by having a voltage gain equal to the design static gain of the autopilot channel. This network comprises a voltage divider circuit composed of resistors 37 and 38, and A.C. amplifier 39, and a demodulator circuit 40. The demodulator circuit is referenced to the trim reference potential by means of divider circuit 41 so that the change in voltage produced by the test input signal will vary about this reference.

Relay switch 36 disconnects the test input voltage from the autopilot channel and connects it to the self-test network to initiate a self-test cycle. To this end switch 36 is adapted to move to its self-test position upon the production of a "no-go" signal voltage during the static gain test cycle.

During a self-test cycle the output of the demodulator 40 is applied through the switching apparatus to the differential cathode follower. Switches 34 and 32 are provided to disconnect the control grids of the differential cathode follower circuit from the autopilot channel and connect them to the self-test circuit at the initiation of a self-test cycle. Thus switches 34 and 32 are also adapted to switch to this self-test position upon the production of a "no-go" signal voltage during the test cycle. Switch 34 is connected to the trim reference potential which is applied through switch 30 to the voltage-storing circuit 14. Switch 30 again operates to charge the capacitor and disconnect it after the required charging time. Switch 32 connects the output of the self-test network to the other grid of the differential cathode follower circuit. In this way the output of the cathode follower circuit is proportional to the change in the output voltage of the self-test network. This self-test output voltage is applied to the comparator circuit. Assuming proper operation of the test equipment and that the injected test voltage is within tolerances, the output of the comparator circuit will produce a "go" signal during the self-test cycle. In the event a "no-go" signal is produced it is representative of a misoperation of the test equipment.

Factors of prime importance in the evaluation of automatic test equipment are reliability and accuracy in operation. In the improved static gain test apparatus of the invention accuracy is limited by the tolerance of the test input voltage, the comparator bias voltage adjustment, and the thyratron firing point. These tolerances may be held quite accurately in terms of the static gain test. The provision of the cathode follower circuit in combination with the voltage-storing element makes negligible any error resulting from the production of a voltage output proportional to the change in the control voltage at point B.

Referring now to the dynamic response test, it may be defined with reference to Fig. 1 as the phase lag between the control voltage signal produced at the output B and the error voltage signal applied at the point A. It is necessary to maintain this phase lag of the autopilot channel within certain tolerances or the missile will be unstable in flight.

In checking the dynamic response of the autopilot channel the present invention employs a closed loop transient response test. In this test a step input voltage is injected into a closed loop including the autopilot channel and the resulting transient voltage is monitored as it decays to zero. The decay time of the transient voltage is proportional to the electrical time constant of the autopilot channel. It is therefore proportional to the phase lag between the points A and B, thus indicating the dynamic response of the channel. A critical decay time value may be selected which is representative of a critical time constant value indicating channel instability. The monitoring of the transient voltage is employed to determine whether the transient voltage decay time exceeds this critical value.

Figure 3:
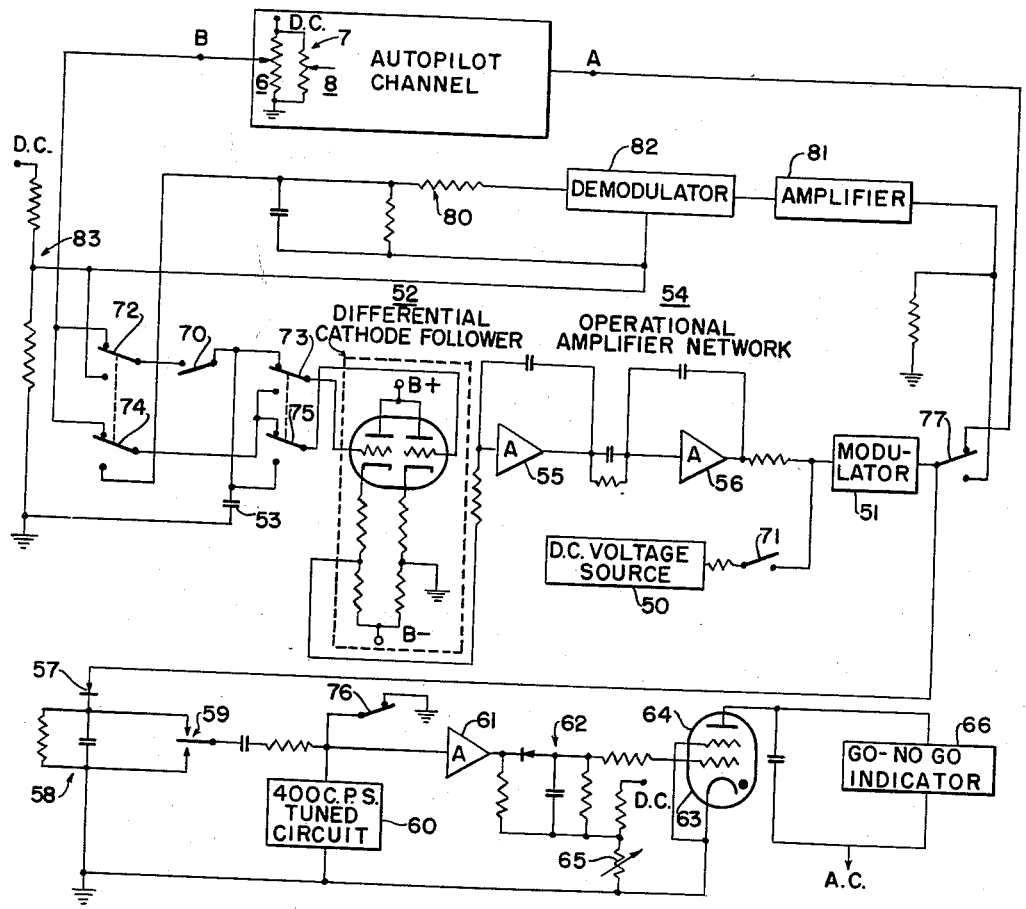
Fig. 3 is a block diagram, portions of which are illustrated schematically, of a dynamic response test apparatus in accordance with the invention.

The test apparatus provided by the present invention for testing the dynamic response of the autopilot channel is illustrated in Fig. 3. The switching circuitry associated therewith will not be fully described until later in the specification. In the apparatus a step input voltage is injected into the closed loop by means of a D.C. voltage source 50. The step voltage is applied through a modulator network 51, the output of which simulates the A.C. output of the gyroscope, to the input A of the autopilot channel.

With the application of this input voltage the output of the autopilot channel at point B oscillates about the trim reference potential of the D.C. bridge follow-up network. This output is applied through switching circuitry to a differential cathode follower 52 and voltage-storing circuit 53 combination identical to that described in connection with the static gain test apparatus. The capacitor 53 again is employed to store a voltage having a value equal to the output of the autopilot channel in the absence of a signal. The output voltage of the capacitor is applied to one of the cathode follower control grids while the oscillating autopilot output produced in response to the step voltage input signal is applied to the other control grid. This produces at the output of the differential cathode follower a test output voltage which is instantaneously equal to the oscillating change in output voltage of the autopilot channel and in addition is referred to a preselected reference potential.

The output of the differential cathode follower is then applied to an operational amplifier network 54 which is connected to close the loop around the autopilot channel. An operational amplifier may be defined as a D.C. amplifier having a feed-back network designed to provide a preselected transfer function characteristic to the amplifier. In the present invention two operational amplifiers 55 and 56 are employed in order to permit the selection of any desired transfer function.

The transfer function selected is designed to provide in combination with the autopilot channel a substantially second order electrical network. Such a network produces an output voltage having a decay time which increases at an expanding rate in response to a uniform increase in the electrical time constant of the autopilot channel. The operational amplifier network thus gives the closed loop an approaching instability such that small variations in the time constant of the channel under test produce large variations in the decay time of the transient voltage in the closed loop. These large variations are easily detected by automatic means.

The output of the operational amplifier network 54 is applied through the modulator 51 to a comparator circuit similar to that employed in Fig. 2. In this case, however, the comparator is preceded by a rectifying diode 57 and a filtering network 58 in order to obtain a voltage which closely follows the decaying envelope of the transient voltage produced by the closed loop. The comparator further differs from that in Fig. 2 in that it is designed to produce a "no-go" signal when the decay time of the transient voltage exceeds the critical decay time indicative of a preselected critical channel time constant.

In order to effect such indication the comparator is adapted to store a reference voltage representing the critical decay time of the transient voltage. The value of the reference voltage is selected to be equal to the value to which the critical transient voltage would decay after a predetermined time interval. The storage of the reference voltage is effected by setting the control grid 63 of the thyratron 64 at a positive bias above cutoff equal to the value of the reference voltage. This bias setting is effected by a variable voltage divider network 65.

The remainder of the circuitry is adapted to vary the bias of the thyratron so that it: remains above cutoff if the transient voltage produced by a test has less than the critical decay time; moves to cutoff if the transient voltage has the critical decay time; and moves to below cutoff if the transient voltage has greater than the critical decay time. To this end one contact of the chopper 59 is connected to a ground reference. The other chopper contact is connected to the rectified transient voltage. The comparator is then adapted to switch into operation at the time at which the critical transient voltage would decay to the reference voltage value. In this way the amplitude of the square wave voltage out of the chopper 59 varies directly with the decay time of the transient voltage, and a transient voltage having the critical decay time produces an amplitude equal to the reference voltage value. A D.C. voltage proportional to the amplitude of the square wave, and negative with respect to the bias reference, is then produced by means of the tuned circuit 60, amplifier 61, and rectifying network 65.

As a result the bias on the thyratron 64 will vary in terms of the transient voltage decay time. If the decay time of the transient voltage is equal to the critical value, a voltage equal to the reference value will be substracted from the thyratron bias and the tube will be at cutoff. If the decay time is less than the critical value, a voltage less than the reference value will be subtracted from the bias and the tube will remain operative. Under this condition the indicator circuit remains energized and produces a "go" signal. If the decay time value is greater than the critical value, a voltage greater than the reference value will be subtracted from the bias and the tube will be cut off. Under this condition the indicator circuit is de-energized and produces a "no-go" signal representing an unsatisfactory dynamic response in the autopilot channel.

The design of the operational amplifier network in the dynamic response test apparatus is effected in the following manner. Initially a determination is made of the critical frequencies for the pitch, roll, and yaw channels of the aircraft under test. The critical frequencies may be obtained from the well-known Nyquist plot of an aircraft. It is at these frequencies that the aircraft is most likely to go unstable in flight. The operational amplifier network associated with a particular channel should therefore be designed to oscillate at the critical frequency of the channel in order to obtain the most realistic test. Critical frequencies arrived at in a representative guided missile plot were:

|  | Rad./sec. |
| --- | --- |
| Pitch | 11–13 |
| Yaw | 22–24 |
| Roll | 5–6 |
|  | 16–20 |

The second design step is to determine the transfer function of the autopilot channel employed in the test for both a theoretical channel and a marginal channel. Control system specifications define the transfer function of the theoretical channel but the transfer function of the marginal channel is more or less arbitrary. The proper criteria for determining the transfer function of the marginal channel is not stability of the aircraft since the aircraft has a wide margin of stability, but rather proper operation of the channel itself.

In the case of a control channel as indicated in Fig. 1 the approximate transfer function is $$\frac{\theta_o}{\theta_i} = K \frac{1}{1+sT_1}$$

where:

$K$ = constant,
$\theta_o$ = signal at B,
$\theta_i$ = signal at A, and
$T_1$ = channel time constant.

A transfer function is defined as the ratio of the output to the input of a system after a differential equation defining the system has been transformed into an algebraic equation through the application of one of the methods of operational calculus. The transformation in the above equation has been effected by means of a Laplace transform and therefore is in terms of the complex variable $s$.

Arbitrarily we may define a marginal channel as one where $T_1$ is 50 percent to 75 percent greater than the value in the theoretical channel. In the case where a phase lead or lag circuit is included in the control channel the phase tolerances of this circuit must be considered in arriving at the time constant of the marginal channel.

Once the marginal control channel transfer function and critical frequency have been determined the closed loop transfer function may be designed. The object of the design is to permit automatic detection of a change in the system time constant by the detection of variations in the time required for a transient response in the closed loop to damp out. To do this the system must be designed to operate in a region where a small change in the time constant result in an appreciable change in the damping time.

Let us assume a second order system of the type $$\frac{\theta_o}{\theta_i} = \frac{1}{1+\frac{2\zeta s}{\omega_n}+\frac{s^2}{\omega_n^2}}$$

where:

$\zeta$ = the damping ratio of the system, viz., the ratio of actual damping to critical damping; and
$\omega_n$ = undamped natural angular frequency of the system.

In such a system $$\frac{d(\omega_n T)}{d\theta}$$

is greater at low values of $\theta$, where:

$T$ = the time for a transient response to decay to a preselected percentage of a step input amplitude, and
$\theta$ = the phase margin of the system.

Operation at a low value of $\theta$ therefore provides a closed loop wherein a small change in the system time constant results in an appreciable change in the damping time of the transient response. It was found impractical to operate at a value smaller than $\theta = 8°$ since at such values drift in the circuitry may result in system instability.

Having decided to employ a second order system, the next design step is to determine an open loop equation which results in a true second order system or responds as one in the region of operation. Since the autopilot channel introduces a term $$\frac{K}{1+sT_1}$$

we cannot get a loop equation of the form $$\frac{1}{1+\frac{2\zeta s}{\omega_n}+\frac{s^2}{\omega_n^2}}$$

However, if we employ an equation of the form $$\frac{K_o}{s^2}\frac{1+sT_2}{1+sT_1}$$

we approach a second order system when $T_1$ is nearly equal to $T_2$, where:

$K_o$ = the open loop gain, and
$T_2$ = the time constant of the operational amplifiers employed to complete the closed loop.

Studies and breadboard results have shown that this system may be employed as a second order system with negligible error at small values of $\theta$.

Having determined the type of open loop equation, the next step in the design process is to evaluate $K_o$ and $T_2$ so that $\theta \cong 8°$ for a marginal autopilot channel. As an example such calculation will be performed with respect to the testing of a pitch autopilot channel having a critical frequency of 12–13 radians/sec. and a theoretical time constant value of 0.0215. Thus we initially know that, $\omega_n = 12$–13 radians/sec. and $T_1 \cong 62.5\%$ greater than 0.0215=0.035.

$K_o$ which is $\cong \omega_n^2$, is therefore $\cong 156$, using a value of 12.5 for $\omega_n$. Arbitrarily therefore we may choose a value of 150 for $K_o$.

To determine the value of $T_2$ we start with the proposition that $$\theta = \tan^{-1} \omega_n T_2 - \tan^{-1} \omega_n T_1 = 8°$$

This results in the following:

$$\tan^{-1} 12.5 T_2 = 8° + \tan^{-1}(12.5)(.035)$$

$$\tan^{-1} 12.5 T_2 = 8° + 23.6° = 31.6°$$

$$12.5 T_2 = \tan 31.6° = .615$$

$$T_2 = .615/12.5 = .0492$$

Arbitrarily we may use $T_2 = .05$.

Once we have determined these constants we may then determine the operational amplifier network transfer function. To do this we must determine what transfer function in combination with the channel transfer function $$\frac{K}{1+sT_1}$$

will produce the total desired transfer function $$\frac{K_o}{s^2}\frac{1+T_2s}{1+T_1s}$$

We arrive at this operational amplifier transfer function by dividing the total transfer function by the channel transfer function. This results in the following:

$$\frac{K_o}{K}\frac{1}{s^2}(1+T_2s)$$

An operational amplifier network 54 which will produce this transfer function is illustrated in Fig. 3.

The dynamic response test apparatus automatically checks the autopilot channel by means of switching relays. These relays are controlled by a timing network adapted to perform the elements of the test in their proper sequence. Any of the well-known timing networks and relays designed for this purpose may be employed. In operation the timer initially closes a relay switch 70 which connects the capacitor 53 to the point B of the autopilot channel through relay switch 72. After a predetermined time interval permitting the capacitor to store its voltage the switch 70 is opened and the output of the capacitor applied to one of the control grids of the cathode follower circuit through relay switch 73. The test step voltage is then applied from the D.C. voltage source 50 to point A of the autopilot channel by the closing of relay switch 71. At this time the output voltage of the autopilot channel is applied to the other control grid of the cathode follower circuit through relay switches 74 and 75.

The timer network is also adapted to switch the comparator circuit into operation. Relay switch 76 is provided for this purpose. This switch ordinarily grounds the input to the A.C. amplifier thus rendering the comparator inoperative. At the predetermined time at which the delay time measurement is to take place the timer network is adapted to trigger switch 76, thus un-grounding the A.C. amplifier and rendering the comparator operative.

It will be noted that the contact arms of switches 73 and 75 are mechanically linked. These contact arms are provided to reverse the connections to the control grids of the cathode follower circuit so that the output of the cathode follower will always have the correct phasing during a dynamic response test.

A self-test circuit is provided for the test apparatus in the event that the indicating circuit 66 produces a "no-go" signal voltage at the end of a dynamic response test cycle. The self-test circuit determines whether the aircraft autopilot channel or test apparatus is at fault in the production of the "no-go" signal. Appropriate remedial steps in accordance with the result of the interrogation may then be taken.

Relay switches 77, 72, and 74 are adapted to connect the test apparatus to the self-test circuit. The self-test circuit includes a network designed to simulate the autopilot channel by having an electrical time constant equal to the critical electrical time constant of the autopilot channel. This network comprises an R.C. circuit 80, an A.C. amplifier 81, and a demodulator circuit 82. The demodulator circuit is referenced to the trim reference potential by means of a divider circuit 83 so that the oscillations in voltage produced by the test step input signal will vary about this reference.

Relay switch 77 disconnects the test step voltage from the autopilot channel and connects it to the self-test network to initiate a self-test cycle. To this end switch 77 is adapted to move to its self-test position upon the production of a "no-go" signal voltage during the dynamic response test cycle.

During a self-test cycle the output of the R.C. circuit 80 is applied through the switching apparatus to the differential cathode follower. Switches 72 and 74 are provided to disconnect the cathodes of the differential cathode follower circuit from the autopilot channel and connect them to the self-test circuit at the initiation of a self-test cycle. Thus switches 72 and 74 are also adapted to switch to their self-test positions upon the production of a "no-go" signal voltage during the test cycle. Switch 72 connects the trim reference potential through switch 70 to the voltage-storage circuit. Switch 70 again operates to charge the capacitor and disconnect it after the required charging time. Switch 74 connects the output of the self-test network to the other grid of the differential cathode follower circuit. In this way the output of the cathode follower circuit is proportional to the oscillating change in the output voltage of the self-test network. The self-test output voltage is applied to the comparator circuit through the operational amplifier and modulator circuits. Assuming proper operation of test equipment the output of the comparator circuit will produce a "go" signal during the self-test cycle. In the event a "no-go" signal is produced it is representative of a misoperation of the test equipment.

The dynamic test apparatus of the present invention is featured by the production of a transient voltage having large decay time variations in response to small variations in the dynamic response of the channel. This permits evaluation of the dynamic response of the system by automatic means and dispenses with the need for human supervision. In addition the circuitry comprising the test apparatus is featured by consistent accuracy in operation.

The preceding description has been concerned with the basic static gain test apparatus and dynamic response test apparatus as employed in the invention. The following is a description of the method and means by which these basic test apparatus units are employed to automatically test a multichannel autopilot system.

Since each of the individual channels of the autopilot system has different characteristics, a separate static gain and dynamic response test apparatus is required for each. All of the static gain test apparatus and all of the dynamic response test apparatus are fundamentally similar. They differ, however, in the detailed circuitry required to couple the test apparatus to different input and output levels and in certain test parameters, such as the operational amplifiers and self-test circuitry.

Due to the plurality of test apparatus the automatic testing of a multichannel autopilot system requires a control device for guiding the various aspects of the test. To this end the invention provides automatic sequence-switching circuitry. The purpose of this switching circuitry is threefold in nature: to initiate a test cycle in an arbitrarily selected first test apparatus; to automatically switch from one test apparatus to another test apparatus upon the satisfactory completion of a test cycle by the first test apparatus, and to do so in a preselected sequence until all of the test cycles have been concluded; and to interrupt the test sequence in the event of the production of a "no-go" signal voltage and to interrogate the test apparatus producing the "no-go" signal voltage to determine whether the test apparatus or the autopilot channel under test is at fault.

Figure 4:
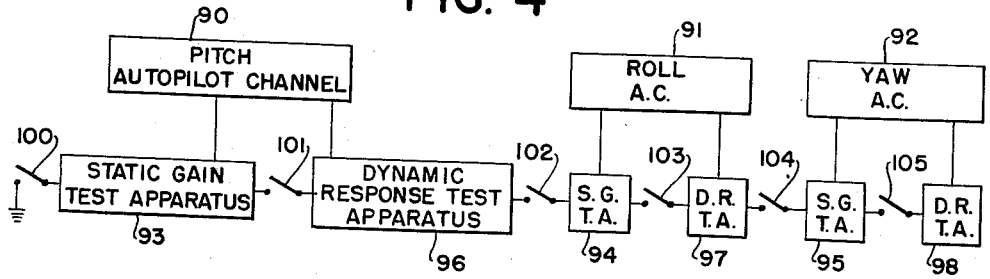
Fig. 4 is a block diagram showing automatic switching circuitry as employed in the invention.

A particular arrangement of such switching circuitry is illustrated generally in block diagram form in Fig. 4. Blocks 90, 91, and 92 represent the three conventionally employed autopilot channels, pitch, roll, and yaw. Each of these channels employs a separate static gain test apparatus 93, 94, and 95 and a separate dynamic response test apparatus 96, 97, and 98.

The test sequence is started by the closing of switch 100. This initiates a test cycle within the static gain test apparatus 93 associated with the pitch autopilot channel. Switch 101 is adapted to close upon the production of a "go" signal voltage at the output of the static gain test apparatus 93, thus initiating a test cycle in the dynamic response test apparatus 96. Switch 102 is adapted to close upon the production of a "go" signal voltage at the output of the dynamic response test apparatus 96. This initiates a test cycle in the test apparatus associated with the roll autopilot channel 91. The sequence-switching will thus continue initiating a test cycle as long as the result of each preceding test cycle is satisfactory and until all of the channels have been tested.

In the event of the production of a "no-go" signal voltage somewhere along the line, the succeeding switch will not close since it is adapted to close only upon the production of a "go" signal voltage. The test apparatus producing the "no-go" indication will then interrogate itself by means of its self-test circuitry as has already been described in connection with Figs. 2 and 3.

It should be noted that the blocks indicating test apparatus do not necessarily represent completely independent units. That circuitry which does not have to be changed because of differing test parameters may be shared in common by different test apparatus. It should also be noted that the sequence of test cycles is not limited to that indicated in Fig. 4 but may be arbitrarily selected.

A preferred embodiment of the invention has been described. Various changes and modifications may be made in the scope of the invention as set forth in the appended claims.

We claim:

1. Dynamic response test apparatus for producing electrically a signal representative of dynamic instability in an aircraft autopilot channel which is a function of the electrical time constant of the said channel comprising an amplifier network having its input connected to the output of said autopilot channel, and its output connected to close a circuit loop around said autopilot channel, said amplifier having a transfer function characteristic providing in combination with said autopilot channel a substantially second order electrical circuit, a generator applying a test step voltage to the input of said autopilot channel for producing in said closed loop a transient voltage having a decay time which increases at an expanding rate in relation to a uniform increase in the electrical time constant of the said autopilot channel, whereby a preselected critical electrical time constant produces a transient voltage having a critical decay time indicative of channel instability, monitoring means connected to the output of said amplifier responsive to a transient voltage in the said closed loop and adapted to compare the decay time of said transient voltage with said critical decay time, and signal means responsive to said monitoring means and adapted to produce a "go" voltage indicative of channel stability when the decay time of said transient voltage is less than the said critical decay time, and to produce a "no-go" voltage indicative of channel instability when the decay time of said transient voltage exceeds the said critical decay time.

2. Dynamic response test apparatus in accordance with claim 1 which further includes a circuit for performing a self-test upon the production of a "no-go" voltage by the said signal means, which self-test circuit comprises a network simulating the said autopilot channel and having the said preselected critical electrical time constant of said channel, and means responsive to the said signal means for initiating a self-test cycle, comprising first switching means adapted upon the production of said "no-go" voltage to substitute said simulating network for the said autopilot channel in the said closed loop, and second switching means adapted upon the production of a said "no-go" voltage to connect the said test step voltage from the said generator to the input of said simulating network to produce a transient voltage in the said closed loop for application to the said monitoring means, whereby the production of a "no-go" voltage by the said signal means during said self-test cycle is representative of misoperation of the said test apparatus.

3. Dynamic response test apparatus in accordance with claim 1 which further comprises a differential cathode follower circuit having a first and second input control grid and adapted to produce an output voltage proportional to the difference in magnitude between a pair of input voltages applied to said control grids, a voltage-storing circuit having its output connected to the said first control grid, first switching means having an "on" condition which connects the input of said voltage-storing circuit to the output of said autopilot channel to initiate a test cycle, and on "off" condition which disconnects the input of said voltage-storing circuit from the output of said autopilot channel, timing means for triggering said first switching means to its "off" condition a predetermined interval after the initiation of said test cycle to store in said voltage-storing circuit a first voltage representative of the output voltage of said autopilot channel in the absence of an input voltage and to establish said first voltage as a reference at the said first control grid, means for connecting the output of said autopilot channel to the said second control grid to produce at the output of said differential cathode follower circuit a test output voltage which is instantaneously proportional to the change in the output voltage of said autopilot channel in response to the said input test step voltage, and means for connecting the output of said differential cathode follower circuit to the input of said amplifier network.

4. Dynamic response test apparatus for producing electrically a signal representative of dynamic instability in an aircraft autopilot channel which is a function of the electrical time constant of the said channel comprising an amplifier network having its input connected to the output of said autopilot channel, and its output connected to close a circuit loop around said channel, said amplifier having a transfer function characteristic providing in combination with said autopilot channel a substantially second order electrical circuit, a generator applying a test step voltage to the input of said autopilot channel for producing in said closed loop a transient voltage having a decay time to a predetermined reference value which increases at an expanding rate in relation to a uniform increase in the electrical time constant of the said autopilot channel, whereby a preselected critical electrical time constant produces a transient voltage having a critical decay time indicative of channel instability, monitoring means comprising a circuit for storing a reference voltage having the said predetermined reference value, and a comparator circuit connected to the output of said amplifier to be responsive to a transient voltage in the said closed loop and adapted to compare the said transient voltage with the said reference voltage at the time a transient voltage having the said critical decay time would decay to the said predetermined reference value, and signal means responsive to said monitoring means for producing a "no-go" voltage indicative of channel instability when the value of said transient voltage is greater than the value of said reference voltage.

5. Test apparatus for electrically verifying the static gain of an aircraft autopilot channel adapted to produce an output voltage of predetermined magnitude in response to an input voltage of predetermined magnitude, which test apparatus comprises a differential cathode follower circuit having a first and second input control grid and adapted to produce an output voltage proportional to the difference in magnitude between a pair of input voltages applied to said control grids, a voltage-storing circuit having its output connected to the said first control grid, first switching means having an "on" condition which connects the input of said voltage-storing circuit to the output of said autopilot channel to initiate a test cycle, and an "off" condition which disconnects the input of said voltage-storing circuit from the output of said autopilot channel, timing means for triggering said first switching means to its "off" condition a predetermined interval after the initiation of said test cycle to store in said voltage-storing circuit a first voltage representative of the output of said autopilot channel in the absence of an input voltage and to establish said first voltage as a reference at the said first control grid, a generator applying a test input voltage of predetermined magnitude to the input of said autopilot channel for producing a second voltage at the output of said autopilot channel, means connected to the output of said autopilot channel for applying said second voltage to the said second control grid to produce at the output of said differential cathode follower circuit a test output voltage which is proportional to the change in the output voltage of said autopilot channel in response to the said test input voltage, and signal means responsive to the output of said differential cathode follower circuit and adapted to produce a "no-go" voltage when the said test output voltage departs by a predetermined maximum from a preselected reference value representative of the design static gain of said autopilot channel, and to produce a "go" voltage when the departure of said test output voltage from said preselected reference value is less than the said predetermined maximum.

6. Test apparatus in accordance with claim 5 in which the said signal means comprises a comparator circuit responsive to the output of said differential cathode follower circuit and adapted to compare the said test output voltage with a reference voltage having a predetermined magnitude representative of the design static gain of said autopilot channel, and means responsive to said comparator circuit for producing a "no-go" voltage when the difference between the said test output voltage and the said reference voltage exceeds a predetermined maximum.

7. Test apparatus in accordance with claim 5 in which the said voltage-storing circuit comprises a capacitor element having one end connected to a preselected reference potential.

8. Test apparatus in accordance with claim 5 which further includes a circuit for performing a self-test upon the production of a "no-go" voltage by the said signal means, which self-test circuit comprises a network simulating the said autopilot channel and having a voltage gain equal to the said design static gain of the said channel, and means responsive to the said signal means for initiating a self-test cycle, comprising first switching means adapted upon the production of a said "no-go" voltage to substitute the output of the said simulating network for the output of the said autopilot channel, and second switching means adapted upon the production of a said "no-go" voltage to connect the said test input voltage from the said generator to the input of said simulating network to produce at the output of said differential cathode follower circuit a self-test output voltage for application to said signal means, whereby the production of a "no-go" voltage by said signal means during said self-test cycle is representative of misoperation of the said test apparatus.

9. An analyzer system for testing electrically the performance of an aircraft autopilot channel, including test apparatus for verifying the static gain of said autopilot channel, which test apparatus comprises a differential cathode follower circuit having a first and second input control grid and adapted to produce an output voltage proportional to the difference in magnitude between a pair of input voltages applied to said control grids, a voltage-storing circuit having its output connected to the said first control grid, first switching means having an "on" condition which connects the input of said voltage-storing circuit to the output of said autopilot channel to initiate a static gain test cycle, and an "off" condition which disconnects the input of said voltage-storing circuit from the output of said autopilot channel, timing means for triggering said first switching means to its "off" condition a predetermined interval after the initiation of said test cycle to store in said voltage-storing circuit a first voltage representative of the output voltage of said autopilot channel in the absence of an input voltage and to establish said first voltage as a reference at the said first control grid, a first generator applying a test input voltage of predetermined magnitude to the input of said autopilot channel for producing a second voltage at the output of said autopilot channel, means connected to the output of said autopilot channel for applying said second voltage to the said second control grid to produce at the output of said differential cathode follower circuit a test output voltage which is proportional to the change in the output voltage of said autopilot channel in response to the said test input voltage, and first signal means responsive to the output of said differential cathode follower circuit and adapted to produce a "no-go" voltage when the said test output voltage departs by a predetermined maximum from a preselected reference value representative of the design static gain of said autopilot channel, and to produce a "go" voltage when the departure of said test output voltage from said preselected reference value is less than the said predetermined maximum, test apparatus for producing a signal representative of dynamic instability in said autopilot channel which is a function of the electrical time constant of the said channel, which test apparatus comprises an amplifier network having its input connected to the output of said autopilot channel and its output connected to close a circuit loop around said autopilot channel, said amplifier having a transfer function characteristic providing in combination with said autopilot channel a substantially second order electrical circuit, a second generator applying a test step voltage to the input of said autopilot channel to initiate a dynamic stability test cycle and for producing in said closed loop a transient voltage having a decay time which increases at an expanding rate in relation to a uniform increase in the electrical time constant of the said autopilot channel, whereby a preselected critical electrical time constant produces a transient voltage having a critical decay time indicative of channel instability, monitoring means connected to the output of said amplifier responsive to a transient voltage in the said closed loop and adapted to compare the decay time of said transient voltage with said critical decay time, and second signal means responsive to said monitoring means and adapted to produce a "go" voltage indicative of channel stability when the decay time value of said transient voltage is less than the said critical decay time value, and to produce a "no-go" voltage indicative of channel instability when the decay time value of said transient voltage exceeds the said critical decay time, and sequence switching means adapted and connected to initiate a test cycle in a second one of said static gain or dynamic stability test apparatus in response to the production of a "go" voltage at the conclusion of a test cycle in a first one of the said test apparatus.

10. An analyzer system in accordance with claim 9 which further includes a self-test circuit for checking the accuracy of the said static gain test apparatus upon the production of a "no-go" voltage by the said first signal means comprising a first network simulating the said autopilot channel and having a voltage gain equal to the said design static gain of the said channel, and means responsive to the said first signal means for initiating a self-test cycle in said static gain test apparatus comprising first switching means adapted upon the production of a said "no-go" voltage to substitute the output of the said simulating network for the output of the said autopilot channel as connected to the said differential cathode follower circuit, and second switching means adapted upon the production of a said "no-go" voltage to connect the said test input voltage from the said first signal generator to the input of said first simulating network to produce at the output of said differential cathode follower circuit a self-test output voltage for application to said first signal means, whereby the production of a "no-go" voltage by the said first signal means during said self-test cycle is representative of misoperation of the said static gain test apparatus, and a self-test circuit for checking the accuracy of the said dynamic stability test apparatus upon the production of a "no-go" voltage by the said second signal means comprising a second network simulating the said autopilot channel and having the said preselected critical electrical time constant of said channel, and means responsive to the said second signal means for initiating a self-test cycle in the said dynamic stability test apparatus comprising third switching means adapted upon the production of a said "no-go" voltage to substitute said second simulating network for the said autopilot channel in the said closed loop, and fourth switching means adapted upon the production of a said "no-go" voltage to connect the said test step voltage from the said second signal generator to the input of said second simulating network to produce a transient voltage in the said closed loop for application to the said monitoring means, whereby the production of a "no-go" voltage by the said second signal means during said self-test cycle is representative of misoperation of the said dynamic stability test apparatus.

References Cited in the file of this patent
UNITED STATES PATENTS

| | | |
|---|---|---|
| 2,609,419 | Blair | Sept. 2, 1952 |
| 2,701,337 | Morrow | Feb. 1, 1955 |